US010473244B2

(12) United States Patent
Nallet et al.

(10) Patent No.: US 10,473,244 B2
(45) Date of Patent: Nov. 12, 2019

(54) TUBE CONNECTOR ASSEMBLY

(71) Applicant: SAINT-GOBAIN PERFORMANCE PLASTICS FRANCE, Charny Orée de Puisaye (FR)

(72) Inventors: Julien Nallet, Saint Didier D'Aussiat (FR); Stéphane Domy, Chaumontel (FR); Mario Fregoso, Whittier, CA (US)

(73) Assignee: SAINT-GOBAIN PERFORMANCE PLASTICS FRANCE, Charny Orée de Puisaye (FR)

(*) Notice: Subject to any disclaimer, the term of this patent is extended or adjusted under 35 U.S.C. 154(b) by 279 days.

(21) Appl. No.: 15/413,623

(22) Filed: Jan. 24, 2017

(65) Prior Publication Data
US 2017/0211736 A1 Jul. 27, 2017

(30) Foreign Application Priority Data

Jan. 26, 2016 (FR) ...................................... 16 50586

(51) Int. Cl.
*F16L 19/05* (2006.01)
*F16L 33/22* (2006.01)
(Continued)

(52) U.S. Cl.
CPC .......... *F16L 33/224* (2013.01); *F16L 19/025* (2013.01); *F16L 19/0225* (2013.01);
(Continued)

(58) Field of Classification Search
CPC ........ F16L 19/02; F16L 19/0212; F16L 19/05
(Continued)

(56) References Cited

U.S. PATENT DOCUMENTS 1,862,833 A * 6/1932 Stover .................. F16L 19/043
285/249
2,120,275 A * 6/1938 Cowles ................. F16L 33/222
285/222.4
(Continued)

FOREIGN PATENT DOCUMENTS

BE 565072 A 7/1960
CH 341365 A 9/1959
(Continued)

OTHER PUBLICATIONS

French Search Report for French Application No.1650586 dated Sep. 30, 2016, 6 pages.
(Continued)

*Primary Examiner* — David Bochna
(74) *Attorney, Agent, or Firm* — Abel Schillinger, LLP; Chi Suk Kim

(57) ABSTRACT

The present invention relates to a tube connector assembly which may comprise a body provided with a through cavity extending in an axial direction, a ring adapted to be mounted at the periphery of a useful portion of the tube and provided, at one of its ends, with a support surface adapted to receive a curved end portion of the tube, a nut adapted to be screwed onto the body so as to compress the curved end portion of the tube against a receiving surface in the axial direction via said ring, and an annular receiving part forming the receiving surface and removably mounted on the body.

20 Claims, 3 Drawing Sheets

(51) Int. Cl.
  *F16L 19/02* (2006.01)
  *F16L 19/025* (2006.01)
  *F16L 19/04* (2006.01)
  *F16L 25/14* (2006.01)
  *F16L 47/04* (2006.01)
  *F16L 41/02* (2006.01)

(52) U.S. Cl.
  CPC ............ *F16L 19/046* (2013.01); *F16L 19/05* (2013.01); *F16L 25/14* (2013.01); *F16L 47/04* (2013.01); *F16L 41/021* (2013.01)

(58) Field of Classification Search
  USPC .......................................... 285/247, 248, 249
  See application file for complete search history.

(56) References Cited

U.S. PATENT DOCUMENTS

| | | | | | |
|---|---|---|---|---|---|
| 2,299,171 | A | * | 10/1942 | Muller | F16L 33/16 285/148.15 |
| 3,025,086 | A | * | 3/1962 | Mosely | F16L 47/04 285/250 |
| 3,115,353 | A | * | 12/1963 | Previati | F16L 33/18 285/14 |
| 3,501,171 | A | | 3/1970 | Baron | |
| 3,659,880 | A | * | 5/1972 | Goldsobel | F16L 5/12 285/149.1 |
| 4,133,565 | A | | 1/1979 | Shutt | |
| 4,614,372 | A | * | 9/1986 | Gschwind | F16L 47/04 285/250 |
| 5,332,269 | A | * | 7/1994 | Homm | B25B 27/10 285/249 |
| 5,709,413 | A | * | 1/1998 | Salyers | F16L 33/223 285/219 |
| 5,743,572 | A | * | 4/1998 | Nishio | F16L 19/041 285/331 |
| 6,626,469 | B2 | * | 9/2003 | Favre | F16L 13/141 285/246 |
| 6,751,392 | B1 | | 6/2004 | Szilagyi et al. | |
| 7,455,328 | B2 | | 11/2008 | Chelchowski et al. | |
| 7,644,958 | B2 | * | 1/2010 | Postler | F16L 33/224 285/23 |
| 9,120,471 | B2 | * | 9/2015 | Ko | B60T 17/043 |
| 2006/0157975 | A1 | * | 7/2006 | Fujii | F16L 19/028 285/247 |
| 2006/0244256 | A1 | * | 11/2006 | Hyobu | F16L 19/025 285/247 |

FOREIGN PATENT DOCUMENTS

| | | | |
|---|---|---|---|
| DE | 3147050 A1 | 6/1983 | |
| EP | 503737 A1 * | 9/1992 | ............ F16L 19/06 |
| EP | 0584009 A2 | 2/1994 | |
| EP | 0823578 A2 | 2/1998 | |
| TW | 351745 B | 2/1999 | |
| TW | 517892 U | 1/2003 | |
| TW | 200530528 A | 9/2005 | |
| WO | 2014148992 A1 | 9/2014 | |
| WO | 2017129556 A1 | 8/2017 | |

OTHER PUBLICATIONS

International Search Report and Written Opinion for PCT Application No. PCT/EP2017/051413 dated Apr. 3, 2017, 15 pages.

* cited by examiner

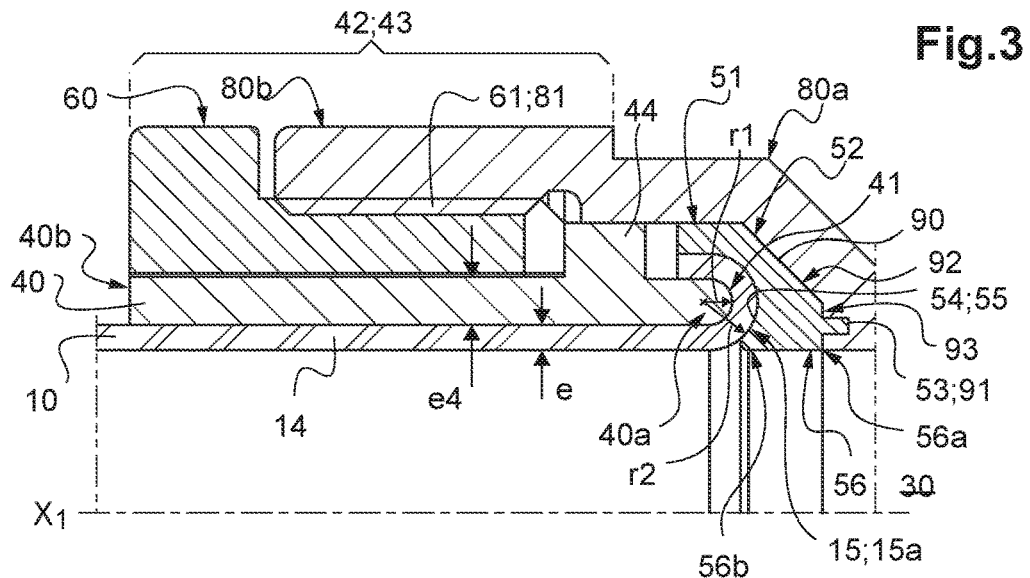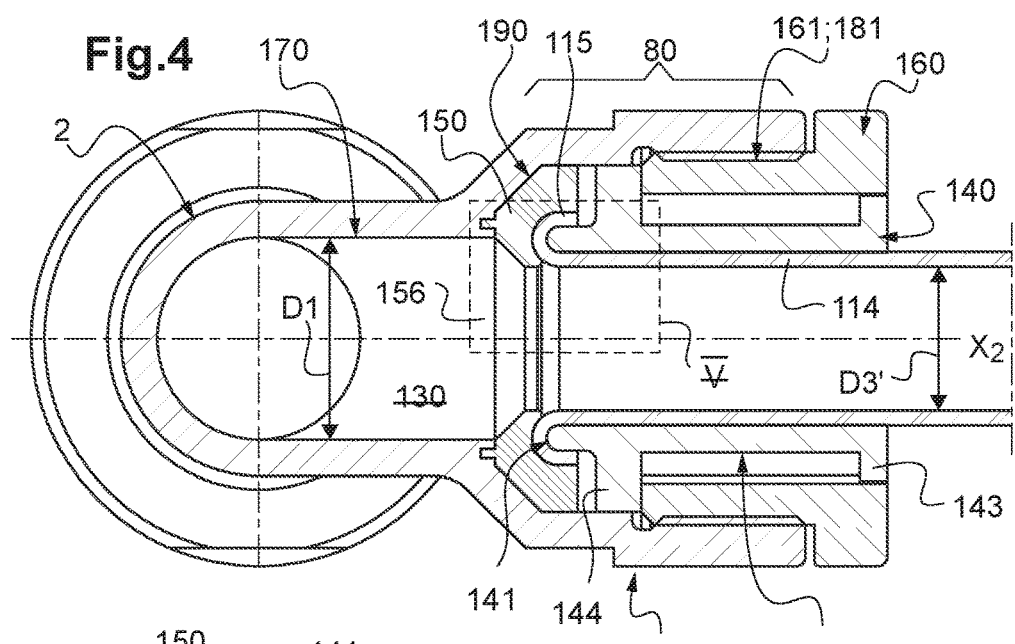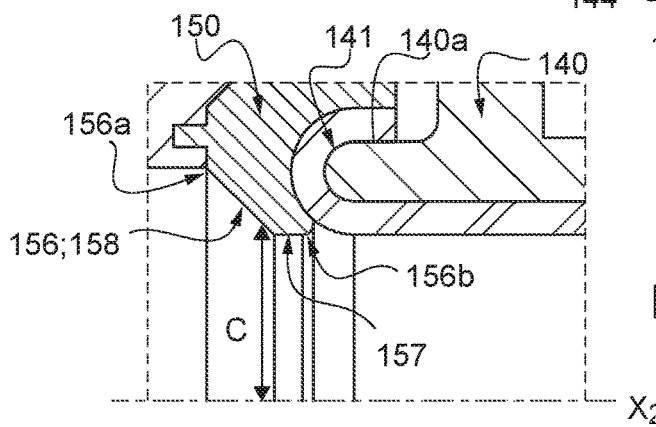

TUBE CONNECTOR ASSEMBLY

CROSS-REFERENCE TO RELATED APPLICATION

This application claims priority under 35 U.S.C. § 119 to French Patent Application 1650586 entitled "TUBE CONNECTOR ASSEMBLY," by Julien Nallet et al., filed Jan. 26, 2016, which is assigned to the current assignee hereof and incorporated herein by reference in its entirety.

FIELD OF THE INVENTION

The present disclosure relates to a tube fitting assembly for connecting at least one tube to another component of a fluid transport circuit such as a connector, a pump, a valve, a manifold, etc.

The connector assembly according to the present disclosure is, in particular, but not limited to, suitable for use in a corrosive and/or high purity fluid transport circuit.

BACKGROUND

In connection with the field of corrosive fluids transport, coupling assemblies are already known for connecting a tube to a body part of another component, comprising a ring part mounted on the periphery of the tube and receiving at one end a curved end portion of the tube, and wherein the sealing is achieved by axially clamping the curved end portion of the tube against a receiving surface through said ring. A connector assembly of this type is described, for example, in patent application EP 0 584 009. However, this connector assembly has the disadvantage of not being easily adaptable to the connection of tubes of different diameters.

SUMMARY OF THE INVENTION

It is one of the objects of the present invention to provide a tube fitting assembly which can be readily adapted to tubes of different diameters.

This objective can be achieved with a tube fitting assembly comprising:

a body provided with a through cavity extending in an axial direction, a ring adapted to be mounted at the periphery of a useful portion of the tube and provided, at one of its ends, with a support surface adapted to receive a curved end portion of the tube, a nut adapted to be screwed to the body so as to compress the curved end portion of the tube against a receiving surface in the axial direction through said ring, and an annular receiving part forming the receiving surface and removably mounted on the body.

The connector assembly according to certain embodiments may be for connecting one or more tubes to another component of the same fluid transport circuit, which may comprise the body. The term "fluid transport circuit" here is understood to mean a set of connected conduits that can be traversed by the fluid.

The body may be, for example, a pump, a valve, a manifold, a coupling, in particular a T, an I, an L or a U-coupling, or a plug. It may be formed from a single monolithic part or from several parts, suitably fastened together.

The body may comprise at least one through cavity to which the tube can be connected. At least a portion of this cavity may form part of the fluid transport circuit in the extension of the tube.

Thereafter, the adjective "axial" and the adverb "axially" are used with reference to the direction of the axis of the cavity in question. With reference to the same cavity, a radial direction is defined as a direction orthogonal to the axis of the cavity and passing through this axis.

When the connector assembly is in the mounted position, the ring, the nut, and at least a useful portion of the tube may extend along the axial direction of the body cavity on which they are mounted.

The ring can be adapted to be mounted at the periphery of a useful portion of the tube and to receive, at one of its axial ends, a curved portion of the tube.

"Useful portion of the tube" means here a portion of the tube forming part of the fluid transport circuit and therefore adapted to the actual transport of fluid.

The curved portion of the tube may be designed to be compressed axially against a receiving surface, in order to seal the system.

According to described embodiments, the receiving surface may be formed by an annular receiving part, distinct from the body, and mounted thereon in a removable manner When the nut is screwed onto the body, the curved end portion of the tube can thus be compressed against the receiving part in the axial direction via the ring. The curved portion of the tube, once clamped between the ring and the receiving part, forms a sealing joint between the tube and the said receiving part.

Since the receiving part is removable, the receiving surface can be changed to adapt to different tube diameters and therefore corresponding rings, the body being able to remain unchanged.

The connector assembly according to the described embodiments is thus modular according to the needs of the user, which can change during the life of the body in question. For example, if the body is a pump, the connector assembly, according to described embodiments, connects tubes of different diameters to said pump, without having to modify the latter. The material of the receiving part may be chosen from a material particularly adapted to achieve a good seal with the tube.

According to a particular embodiment, the receiving part may thus be made of a material that is more flexible than the body, the stiffness of which must be sufficient to ensure a good resistance of its connection by screwing with the nut.

The receiving part may also be made of a material that is more flexible than the ring (in other words, the receiving part may be made of a material whose Young's modulus is smaller than that of the material forming the ring) ensuring a better punching effect during tightening and therefore better sealing.

According to another embodiment, the connector assembly may also comprise sealing means for sealing between the body and the receiving part.

According to yet another embodiment, the receiving part or the body may be provided with at least one male element and the other, either the receiving part or the body, may be provided with a female element adapted to cooperate by clamping with the male element to achieve sealing between the two parts.

For example, the receiving part may be provided with an annular rib and the body may be provided with a groove, the rib being adapted to clamp radially and axially in said groove to ensure sealing.

According to another embodiment, the sealing means may comprise a seal, in particular an O-ring, which can be placed between the receiving part and the body.

According to another embodiment, the cavity of the body may comprise a main section and a widened end section opening outwards. The body may then have a shoulder at the junction between the main section and the end section.

In this case, the sealing means can provide sealing between the receiving part and said shoulder.

According to yet another embodiment, the receiving part may be adapted to be mounted inside the body bearing against the shoulder, in particular on the part of said shoulder carrying sealing means, if necessary.

According to a particular embodiment, the body and the receiving part may be configured to cooperate positively in order to lock the receiving part relative to the body, in the radial direction.

According to another embodiment, the receiving part may have a useful internal surface, configured to make the junction between the main section of the cavity and the useful portion of the tube. It will be understood that the receiving part may then delimit, with its useful internal surface, a portion of the fluid circulation circuit. In this case, the receiving part is preferably shaped so that the junction between the main section of the cavity and the useful portion of the tube is progressive (without sudden break), in order to avoid the creation of recesses, and therefore retention areas, which can disrupt the fluid flow.

In a case where the internal diameter of the tube and the diameter of the main section of the cavity of the body are substantially identical, the effective internal surface of the receiving part may be cylindrical, the diameter of which may be substantially equal to the internal diameter of the main section.

According to another embodiment, when the internal diameter of the tube and the diameter of the main section of the body cavity are different, the effective internal surface of the receiving part can expand over at least a part of its axial length. For example, the effective internal surface may, on at least one axial section, have a generally frustoconical shape.

In order to further improve the sealing between the tube and the receiving part, the latter may have an annular groove, in particular a groove with a curved axial cross-section, configured to cooperate positively with the compressed end portion of the tube. The positive fit between the receiving surface and the curved portion of the tube increases the contact area between the two parts and thus reduces the risk of leakage.

According to another embodiment, the nut may be configured to be screwed inside the body cavity. Such a configuration allows increasing the compactness of the connector assembly. Moreover, the mechanical stresses in the nut may be reduced, the applied forces being in alignment with the axial clamping forces of the curved portion of the tube on the receiving part.

According to another embodiment, the nut may be formed integrally with the ring, or, on the contrary, it may be distinct from the ring. In the latter case, the nut may be adapted to cooperate with the ring so as to drive it integrally in the axial direction.

According to another embodiment, the nut may not be in contact with the tube. Thus, the tube is not damaged when screwing the nut.

According to another particular embodiment, the nut may be configured to be mounted on the periphery of the ring, and the ring may be provided with abutment means with which the nut is adapted to cooperate in order to integrally displace said ring in the axial direction. The nut being mounted on the periphery of the ring, it is possible to use a same nut with rings of different internal diameters, adapted to tubes of different diameters. Thanks to these arrangements, it is thus possible to combine, with a single body and a single nut, several rings and possibly several different reception parts, in order to adapt the system to tubes of different diameters.

The abutment means may comprise, for example, a rib formed at the periphery of the ring, in particular a rib extending over the entire circumference of the ring.

The connector assembly, according to one embodiment, can be adapted for use in a circuit for transporting toxic and/or corrosive fluids, in particular of the type which can be used in the semiconductor industry, where the sealing requirements are very stringent. Liquid chemicals used in the manufacture of semiconductors are, for example, solvents such as trichloroethylene, acetone, etc., for cleaning or degreasing operations, and acids and/or bases such as sulfuric acid, nitric acid, hydrochloric acid, etc., used to carry out semiconductor attacks or to perform surface preparations and regenerations.

According to one embodiment, the body and/or the receiving part, and/or the tube, and/or the ring, and/or the nut, may be made of a plastic material.

According to one embodiment, at least one of these elements is, for example, made of a fluoropolymer. According to another embodiment, each of these elements is, for example, a fluoropolymer.

In the context of the described embodiments, the term "fluoropolymer" refers to any polymer having in its chain at least one monomer chosen from compounds containing a vinyl group capable of polymerizing, or propagating, a polymerization reaction, and which contains, directly attached to said vinyl group, at least one fluorine atom, one fluoroalkyl group or one fluoroalkoxy group.

By way of example of monomer, mention may be made of vinyl fluoride; vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers such as perfluoro(methyl vinyl)ether (PMVE), perfluoro (ethyl vinyl)ether (PEVE) and perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ wherein X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_n CH_2OCF=CF_2$ wherein n is 1, 2, 3, 4 or 5; the product of formula $R_1CH_2OCF=CF_2$ wherein $R_1$ is hydrogen or $F(CF_2)_z$ and z is 1, 2, 3 or 4; the product of formula $R_3OCF=CH_2$ wherein $R_3$ is $F(CF_2)_z$— and z is 1, 2, 3 or 4; perfluorobutylethylene (PFBE); 3,3,3-trifluoropropene; 2-trifluoromethyl-3,3,3-trifluoro-1-propene.

The fluoropolymer may be a homopolymer or a copolymer; it may also comprise non-fluorinated monomers such as ethylene. In particular, the fluorinated polymer may be chosen from fluorinated ethylene-propylene (FEP), ethylenetetrafluoroethylene (ETFE), polytetrafluoroethyleneperfluoro-propylvinylether (PFA), polytetrafluoroethylene-perfluoromethylvinylether (MFA), polytetrafluoroethylene polyvinylidene fluoride (PVDF), ethylene chlorotrifluoroethylene (ECTFE), polychlorotrifluoroethylene (PCTFE), or a combination thereof.

Fluoropolymers allow avoiding contamination possibilities, which can be advantageous for high purity applications. Fluoropolymers also have the advantage of resisting chemicals, in particular acids such as sulfuric acid ($H_2SO_4$), hydrofluoric acid (HF) or phosphoric ($H_3PO_4$), which are used, in particular, for the manufacture of semiconductors.

It should be noted that, although they are not intended to be in direct contact with the fluid, the nut and the ring may also be made of fluoropolymer.

According to one embodiment, the reception part may be made of one of the materials chosen from polytetrafluoroethyleneperfluoropropylvinylether (PFA), polytetrafluoroethylene-perfluoromethylvinyl ether (MFA) and polytetrafluoroethylene (PTFE), or a combination thereof.

According to another embodiment, the ring may be made of one of the materials chosen from polyvinylidene fluoride (PVDF), ethylenetetrafluoroethylene (ETFE), ethylenechlorotrifluoroethylene (ECTFE), polychlorotrifluoroethylene (PCTFE), or a combination thereof.

According to another embodiment, the nut may be made of ethylenetetrafluoroethylene (ETFE) or polyvinylidene fluoride (PVDF), or a combination thereof.

According to another embodiment, the body may be made of polytetrafluoroethyleneperfluoro-propylvinylether (PFA) or polytetrafluoroethylene (PTFE), or a combination thereof.

According to another embodiment, the connector assembly may further comprise a tube, one end portion of which is bent back against the support surface of the ring. The tube may, for example, be made of polytetrafluoroethyleneperfluoro-propylvinylether (PFA), fluorinated ethylene-propylene (FEP), polytetrafluoroethylene-perfluoromethylvinyl ether (MFA), ethylenetetrafluoroethylene (ETFE) or polyvinylidene fluoride (PVDF), or a combination thereof.

Several embodiments or exemplary embodiments are described in the present disclosure. However, unless otherwise specified, the features described in connection with any embodiment or exemplary embodiment may be applied to another embodiment or exemplary embodiment.

BRIEF DESCRIPTION OF THE DRAWINGS

The present disclosure will be well understood and its advantages will appear more clearly from the following detailed description of an embodiment, shown by way of non-limiting example. The description refers to the accompanying drawings in which:

FIG. 3 is a view of the detail III of FIG. 2;
FIG. 4 is an example section according to IV of FIG. 1;
FIG. 5 is a view of the detail V of FIG. 4.

DETAILED DESCRIPTION

Figure 1:
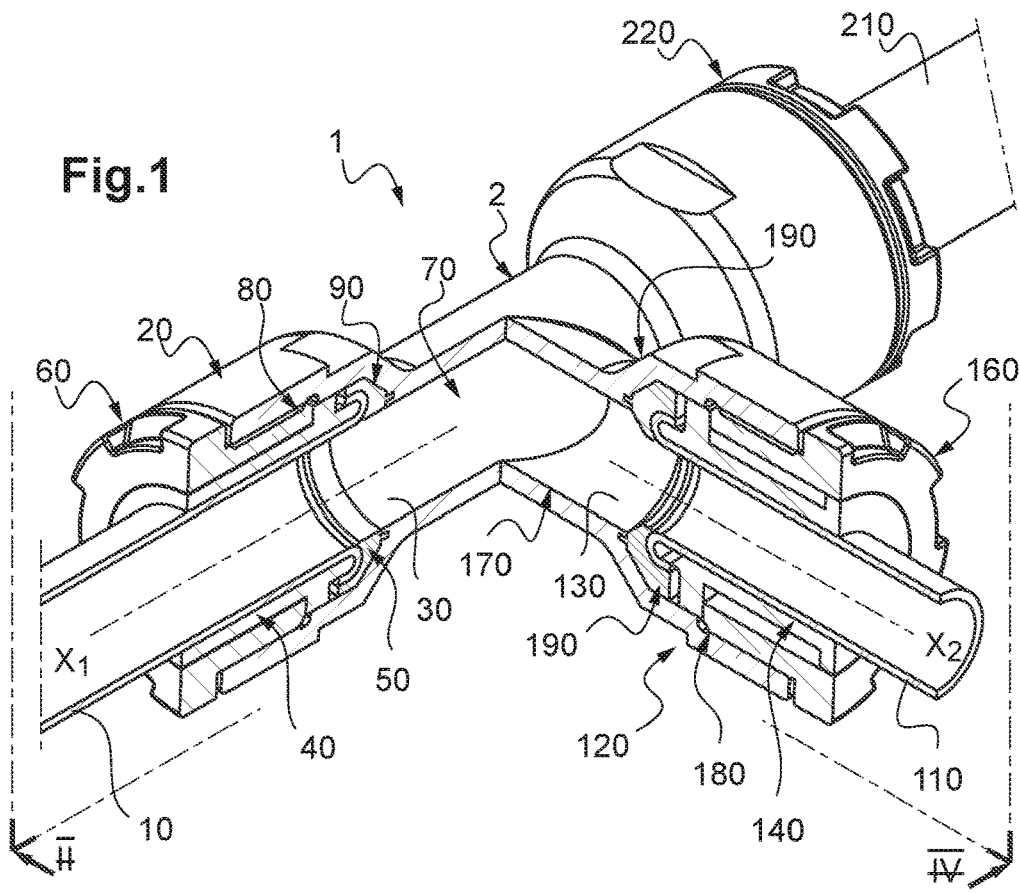
FIG. 1 is a perspective view of an example connector assembly for a tube according to one embodiment.

FIG. 1 shows a connector assembly 1 according to an embodiment for connecting, on a body 2 forming a T-connection with three branches, 20, 120, 220, of three tubes 10, 110, 210.

The body 2 and the tubes 10, 110, 210 are, for example but not exclusively, made of PFA.

Figure 2:
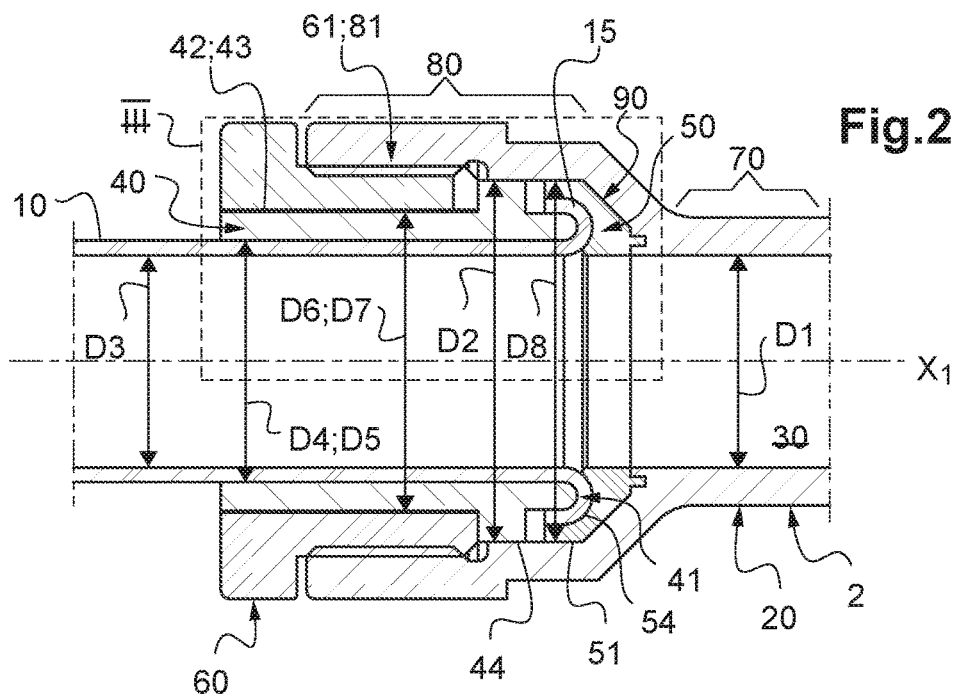
FIG. 2 is an example section according to II of FIG. 1.

As illustrated in more detail in FIGS. 2 and 3, the connector assembly 1 comprises, at the first branch 20:

a body part defining a through cylindrical cavity 30 of axis X1, a ring 40 adapted to be mounted at the periphery of a useful portion of the tube 10 and provided, at one of its ends, with a support surface 41 adapted to receive a curved end portion of the tube 15, an annular receiving part 50 removably mounted in the cavity 30 of the body 2, and defining a receiving surface 54 for the curved end portion 15 of the tube 10, and a nut 60 adapted to cooperate with the ring 40 and to be screwed onto the body 2 so as to compress the curved end portion 15 of the tube 10 against the receiving surface 54 of the receiving part 50, in the axial direction, by means of the ring 40.

The cavity 30, which communicates with other cavities of the body 2 and, in particular, with the through cavities of the second and third branches 120, 220, comprises at least one main section 70 of diameter D1 and a widened end section 80, of diameter D2 greater than D1 (see FIG. 2). The end section 80 opens outwards at its rear end 80b, and is connected to the main section at its front end 80a by a shoulder 90. As illustrated in FIG. 3, the shoulder 90 here comprises a first generally frustoconical part 92 connected to the enlarged end section 80, and a second part 93 extending radially (orthogonally to the axis X1) connected to the main section 70.

Throughout the remainder of the present disclosure, the terms "front" and "rear" will be used with reference to the axial direction, the mounting of the ring 40 and the nut 60 through the rear end of the through cavity 30 being made towards the front (towards the body).

As illustrated in FIGS. 2 and 3, the widened end section 80 of the cavity is provided, at its rear end 80b, with an internal thread 81 whose function will be specified hereinafter.

As illustrated in FIG. 2, the ring 40 forms a tubular sleeve, the axis of which, in the mounted position, coincides with the axis X1 of the cavity 30 of the body.

It is for example made of polyvinylidene fluoride (PVDF), ethylenetetrafluoroethylene (ETFE), ethylenechlorotrifluoroethylene (ECTFE) or polychlorotrifluoroethylene (PCTFE).

The ring 40 surrounds a useful portion 14 of the tube where said tube 10 is cylindrical, of internal diameter D3 and of external diameter D4 (see FIG. 2).

To enable it to be mounted on the tube 10, the ring 40 has an internal diameter D5 substantially equal to or slightly greater than the external diameter D4 of the tube 10.

The front end 40a of the ring 40, directed towards the body 2 in the mounted position, forms a support surface 41 adapted to receive the curved end portion 15 of the tube 10.

In the embodiment (see in particular FIG. 3), the axial end 40a of the ring 40 is rounded, the support surface 41 having, in particular, an axial semi-circular cross-section with a radius of curvature r1 equal to half the thickness e4 of the ring.

According to variants (not shown), the end 40a of the ring 40 may have any other suitable shape. It may, for example, have an axial section in the form of a point with a rounded end, with a radius less than e4/2.

In the embodiment, the end portion 15 of the tube 10 is curved around the support surface 41 so that an axial end surface 15a of the said curved portion 15 has a semicircular axial section with a radius of curvature r2 equal to the radius of curvature r1 of the support surface 41 of the ring 4, with the added thickness e of the tube 10.

As illustrated in FIGS. 2 and 3, the nut 60 is a separate part from the ring 40, configured to be mounted at the periphery of the ring 40 and provided with a thread 61, external in this case, adapted to cooperate by screwing with the internal thread 81 of the body 2. It is, for example, made of polyvinylidene fluoride (PVDF).

As illustrated in the figures, the nut 60 is not in contact with the tube 10.

More particularly, the nut 60 is adapted to be engaged on the ring 40 through the rear end 40b of the latter, opposite to the support surface 41. It will be understood that during the mounting of the assembly 1, the nut 60 is engaged on the tube 10 before the ring 40, or at the same time as the latter.

As shown in FIG. 2, to enable mounting of the nut 6, the ring 4 has at least one mounting section 42 extending from the rear end 40b, having an external diameter D6 substantially equal to, or smaller than the internal diameter D7 of the nut 6. At least one part 43 (in the embodiment, the entire length) of said section 42 has an external diameter substantially equal to the internal diameter of the nut 60.

At the same time, and as indicated above, the nut 60 is adapted to cooperate with the ring 40 in order to move the latter integrally in the axial direction X. The ring 40 is, for this purpose, provided with abutment means with which the nut 60 is adapted to cooperate axially in order to integrally displace said ring 40 in the axial direction. These abutment means comprise, in the embodiment, an annular and continuous circumferential rib 44 formed at the periphery of the ring 40, near the front end 40a of said ring 40 carrying the support surface 41.

According to an arrangement illustrated in FIGS. 2 and 3, the rib 44 may be dimensioned to bear radially against the internal surface of the body 2, in the mounted position, enabling a prepositioning of the ring before mounting the nut.

The removable receiving part 50, which has an annular shape, is mounted inside the cavity 30 of the body 2. It is, for example, made of polytetrafluoroethyleneperfluoro-propylvinylether (PFA), polytetrafluoroethylene-perfluoromethylvinyl ether (MFA) or polytetrafluoroethylene (PTFE).

The receiving part 50 is configured here to cooperate positively with the body 2.

For this purpose, and as illustrated in FIG. 2, the part 50 comprises a cylindrical radially outer surface 51 of diameter D8 substantially identical to the diameter D2 of the widened end section 80, which ensures its blocking with respect to the body 2 in the radial direction.

As shown in FIG. 3, the receiving part 50 further comprises a front surface 52, directed towards the interior of the body 2, shaped to bear, at least in part, on the shoulder 90.

As shown in the figure, the sealing between the receiving part and the body is achieved here by the cooperation of an annular rib 53 projecting from the front surface 52 of the receiving part and a groove 91 formed in the surface of the second part 93 of the shoulder 90.

This sealing system allows at the same time to avoid any radial deformation of the receiving part 50 which can lead to the formation of retention zones disturbing the flow of the fluid.

As an alternative, the sealing between the receiving part and the body could be achieved by any other suitable system, for example, by a gasket partly compressed in at least one groove formed in one of the receiving part and the body, and another part which could be compressed against the other of the receiving part and the body.

As previously indicated, the receiving part 50 therefore bears against part of the shoulder 90, and more particularly against the second part 93 of the shoulder which comprises the groove 91 and which is also directly opposite the shoulder zone of the receiving surface for receiving the curved portion of the tube.

The receiving part 50 further comprises a rear surface 54 directed towards the open end of the cavity 30 forming the receiving surface on which the curved end portion 15 of the tube 10 can be clamped under the effect of the screwing of the nut 60 on the body 2.

The receiving part 50 further comprises a rear surface 54, directed towards the open end of the cavity 30 forming the receiving surface on which the curved end portion 15 of the tube 10 can be clamped upon screwing of the nut 60 on the body 2.

As illustrated in FIG. 3, the receiving surface 54 may include an annular groove 55, in particular a groove with a curved axial cross-section, configured to cooperate positively with the compressed end portion 15 of the tube 10. In the embodiment illustrated in FIG. 3, the groove 55 has at least one section in a semi-circle having a radius of curvature r2.

Finally, the receiving part 50 comprises a useful radially internal surface (hereinafter the useful surface) 56 intended to make the junction between the useful portion 14 of the tube 10 and the main section 70 of the cavity 30. In other words, as illustrated in FIG. 3, a rear end 56b of said useful surface may be in contact or flush with the internal surface of the useful portion 15 of the tube 10, and a front end 56a of said useful surface 56 may be in contact or flush with the internal surface of the main section 70.

In the embodiment, the internal diameter D3 of the tube 10 and the diameter D1 of the main section 70 of the cavity 30 of the body are substantially identical. The useful surface 56 is thus exactly aligned with the internal surface of the tube 10 and the internal surface of the cavity 30, the three elements forming a cylindrical conduit of constant diameter.

The useful surface 56 of the receiving part 50 is therefore cylindrical with a diameter substantially equal to the internal diameter D1 of the main section 70.

As will be explained hereinafter, the connector assembly 1 according to the described embodiments allows connecting tubes of different diameters to the same cavity 30 of the body 2. To do this, it suffices to adapt the receiving part 50 and the ring 40 to the diameter of the tube to be connected.

In the example of FIG. 1, the cylindrical cavity 130 of the second branch 120 of the body 2 has the same structure and dimensions as the cavity 30 described above.

However, the tube 110 connected to this second cavity has a smaller diameter than that of the tube 10. In particular, the internal diameter D3' of the tube 110 is smaller than the internal diameter D1 of the main section of the cavity 130.

FIG. 4 illustrates in more detail the connection of the tube 110. In this figure, the elements identical or similar to those described in connection with FIGS. 2 and 3 are designated by the same reference number incremented by 100, and are not described again thereafter.

The ring 140 is mounted at the periphery of a useful portion 114 of the tube 110. Its internal diameter is substantially equal to, or slightly greater than the external diameter of the tube 110.

As in the previous embodiment, the nut 160, identical to the nut 60 described above, is adapted to be mounted on a mounting section 142 of the ring 140. To save the material of the ring on the one hand, and limit the friction between the ring 140 and the nut 160 on the other hand, only a portion 143 of the said mounting section 142 has an external diameter substantially equal to the internal diameter of the nut so that the nut 160 can bear on it.

Likewise, as in the preceding example, the receiving part 150 has a useful internal surface 156 intended to make the junction between the useful portion 114 of the tube 110 and the main section 170 of the cavity 130.

In the example, due to the difference in diameter between the tube 110 and the main section 170 of the cavity 130, the useful surface 156 flares over at least a part of its axial length, particularly towards the front. In other words, the useful surface 156 has a spacing c with the axis X which increases from its rear end 156b or a point between said rear end 156b and its front end 156a, towards its front end 156a.

In the example of FIGS. 4 and 5, more particularly, the useful surface 156 comprises a first cylindrical portion 157 extending from its rear end 156b connected to the internal surface of the tube 110, and a second portion 158, located directly in the extension of said first portion 157, of flared shape, generally frustoconical. According to other variants, the useful surface 156 may also comprise a flared portion of a different shape, for example the useful surface 156 may comprise a flared portion with a curved profile.

It should be noted that if the diameter of the tube to be connected was, unlike in the previous description, larger than the diameter of the main section of the cavity, the receiving part could also be configured so that the useful internal surface of said receiving part flares towards the rear.

Figure 6:
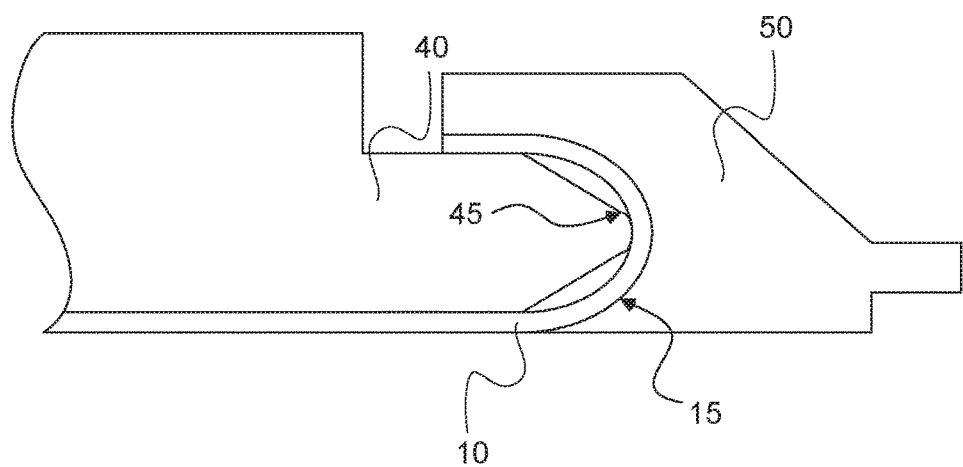
FIG. 6 is an example section according to II of FIG. 1.

As shown in FIG. 6, alternate configurations for the ring (40) may provide improved performance in particular circumstances. For example, FIG. 6 shows the interface of a ring (40) with a curved end portion (15) of a tube (10). The ring (40) may have a beveled or chamfered surface (45) at the interface with the curved end portion (15) of the tube (10). Consequently, the ring (40) may only partially contact the curved end portion (15) of the tube (10) such that the ring (40) is not in contact with the curved end portion (15) of the tube (10) over the entire surface of the curved end portion (15) of the tube (10) at the interface. This feature may provide a better seal while reducing damage to the tube (10), which may result in improved sealing performance of the connector assembly and enhanced durability of the tube (10). While FIG. 6 shows the ring (40), this design may also be used in the ring (140) of FIG. 4 and FIG. 5.

Thus, the connector assembly described above allows connecting, on through cavities of same dimensions, pipes of different diameters by simply changing the receiving part and the ring on which the tube is turned, while the nut can be retained for use with these different tubes.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the embodiments as listed below.

Embodiment 1

A connector assembly (1) for a tube (10, 110) comprising a body (2) provided with at least one through cavity (30, 130) extending in an axial direction (X), at least one ring (40, 140) adapted to be mounted at the periphery of a useful portion (14, 114) of the tube (10, 110) and provided, at one of its ends (40a, 140a), with a support surface (41, 141) adapted to receive a curved end portion (15,115) of the tube (10,110), at least one nut (60, 160) adapted to be screwed onto the body (2) so as to compress the curved end portion (15,115) of the tube (10,110) against a receiving surface (54, 154) in the axial direction (X) via said ring (40, 140), characterized in that it further comprises at least one annular receiving part (50, 150) forming the receiving surface (54, 154) and removably mounted on the body (2).

Embodiment 2

The connector assembly according to embodiment 1, comprising sealing means between the body and the receiving part (50, 150).

Embodiment 3

The connector assembly according to embodiment 2, wherein the receiving part or the body is provided with at least one male element and the other, from the receiving part or the body, is provided with a female element adapted to cooperate by clamping with the male element to achieve sealing between the two parts.

Embodiment 4

The connector assembly according to any one of embodiments 1 to 3, wherein the cavity (30, 130) of the body comprises a main section (70, 170) and an enlarged end section (80, 180) opening outwards, the body (2) having a shoulder (90, 190) at the junction between the main section (70,170) and the end section (80,180), and the receiving part (50, 150) is adapted to be mounted inside the body (2) bearing against said shoulder (90, 190).

Embodiment 5

The connector assembly according to embodiment 4, wherein the receiving part (50, 150) has a useful internal surface (56, 156) configured to connect the main section (70, 170) of the cavity (30,130) and the useful portion (14,114) of the tube (10,110).

Embodiment 6

The connector assembly according to embodiment 5, wherein the useful internal surface (56) of the receiving part (50) is cylindrical with a diameter substantially equal to the internal diameter of the main section (70).

Embodiment 7

The connector assembly according to embodiment 5, wherein the useful internal surface (156) of the receiving part (150) flares over at least part of its axial length.

Embodiment 8

The connector assembly according to any one of embodiments 1 to 7, wherein the body (2) and the receiving part (50, 150) are configured to positively cooperate for blocking the receiving part (50, 150) relative to the body (2) in the radial direction.

Embodiment 9

The connector assembly according to any one of embodiments 1 to 8, wherein the nut (60, 160) is configured to be mounted at the periphery of the ring (40,140), and the ring (40, 140) is provided with abutment means (44, 144) with which the nut (60, 160) is adapted to cooperate to integrally move said ring (40, 140) in the axial direction.

Embodiment 10

The connector assembly according to embodiment 9, wherein the abutment means (44, 144) comprise a rib formed at the periphery of the ring (40, 140), in particular a rib extending over the entire circumference of the ring, (40,140).

Embodiment 11

The connector assembly according to any one of embodiments 1 to 10, wherein the nut (60, 160) is configured to be screwed into the cavity (30, 130) of the body (2).

Embodiment 12

The connector assembly according to any one of embodiments 1 to 11, wherein the receiving part (50, 150) has an annular groove (55, 155), especially an axial section curved groove, configured to positively cooperate with the compressed end portion (15, 115) of the tube (10, 110).

Embodiment 13

The connector assembly according to any one of embodiments 1 to 12, wherein the receiving part (50, 150) is made of a material less rigid than the ring (40, 140) forming the support surface (41, 141).

Embodiment 14

The connector assembly according to any one of embodiments 1 to 13, wherein at least one of the receiving part (50, 150), the body (2), the ring (40, 140) and the nut (60, 160) is made of fluoropolymer.

Embodiment 15

The connector assembly according to embodiment 14, wherein the receiving part is made of one of the materials chosen from polytetrafluoroethyleneperfluoro-propylvinylether (PFA), polytetrafluoroethylene-perfluoromethylvinyl ether (MFA) and polytetrafluoroethylene PTFE), or a combination thereof.

Embodiment 16

The connector assembly according to embodiment 14 or 15, wherein the ring (40, 140) is made of one of materials selected from poly(vinylidene fluoride) (PVDF), ethylenetetrafluoroethylene (ETFE), ethylene chlorotrifluoroethylene (ECTFE), polychlorotrifluoroethylene (PCTFE), or a combination thereof.

Embodiment 17

The connector assembly according to any one of embodiments 1 to 16, wherein the body (2) is a pump, a valve, a manifold, a fitting, in particular a T-, an I-, an L- or a U-fitting, or a stopper.

Embodiment 18

The connector assembly according to any one of embodiments 1 to 17, further comprising a tube, one end portion of which is curved against the support surface of the ring.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A connector assembly for a tube comprising:
   a body provided with a cavity extending in an axial direction,
   a ring adapted to be mounted at the periphery of a useful portion of the tube, the ring having at one end a support surface adapted to receive a curved end portion of the tube, a nut adapted to be screwed onto the body so as to engage the ring to press the curved end portion of the tube against a receiving surface in the axial direction, and
   an annular receiving part forming the receiving surface and removably mounted on the body, wherein the nut is mounted at the periphery of the ring, and
   wherein the ring comprises a rib.

2. The connector assembly according to claim 1, comprising a seal between the body and the receiving part.

3. The connector assembly according to claim 2, wherein the seal comprises a male element and a female element.

4. The connector assembly according to claim 1, wherein the cavity of the body comprises a main section and an enlarged end section opening outwards, wherein the body comprises a shoulder at the junction between the main section and the end section, and wherein the receiving part is mounted inside the body against the shoulder.

5. The connector assembly according to claim 4, wherein the receiving part has a useful internal surface configured to connect the main section of the cavity and the useful portion of the tube.

6. The connector assembly according to claim 5, wherein the useful internal surface of the receiving part is cylindrical with a diameter substantially equal to the internal diameter of the main section.

7. The connector assembly according to claim 5, wherein the useful internal surface of the receiving part is frusto-conical.

8. The connector assembly according to claim 1, wherein the body and the receiving part lock the receiving part relative to the body in the radial direction.

9. The connector assembly according to claim 1, wherein rib extends over the entire circumference of the ring and engages the nut.

10. The connector assembly according to claim 1, wherein the nut is configured to be screwed into the cavity of the body.

11. The connector assembly according to claim 1, wherein the receiving part has an annular groove.

12. The connector assembly according to claim 1, wherein the receiving part is made of a material having a first Young's modulus, wherein the ring forming the support surface is made of a material having a second Young's modulus, and wherein the first Young's modulus is less than the second Young's modulus.

13. The connector assembly according to claim 1, wherein at least one of the receiving part, the body, the ring and the nut comprises a fluoropolymer.

14. The connector assembly according to claim 13, wherein the receiving part comprises a material selected from the group consisting of polytetrafluoroethyleneper-fluoro-propylvinylether (PFA), polytetrafluoroethylene-perfluoromethylvinyl ether (MFA), and polytetrafluoroethylene PTFE).

15. The connector assembly according to claim 13, wherein the ring comprises a material selected from the group consisting of poly(vinylidene fluoride) (PVDF), ethylenetetrafluoroethylene (ETFE), ethylene chlorotrifluoroethylene (ECTFE), and polychlorotrifluoroethylene (PCTFE).

16. The connector assembly according to claim 13, wherein the nut comprises a material selected from the group consisting of polytetrafluoroethyleneperfluoro-propylvinylether (PFA), polytetrafluoroethylene-perfluoromethylvinyl ether (MFA), and polytetrafluoroethylene PTFE).

17. The connector assembly according to claim 1, wherein the body is a pump, a valve, a manifold, a fitting, or a stopper.

18. The connector assembly according to claim 1, wherein the tube comprises an end portion which is curved against the support surface of the ring.

19. The connector assembly according to claim 18, wherein the support surface of the ring contacts only a portion of the end portion of the tube.

20. The connector assembly according to claim 19, wherein the support surface of the ring comprises a beveled surface.

* * * * *